United States Patent [19]

Hands, deceased et al.

[11] 3,919,054

[45] Nov. 11, 1975

[54] DISTILLATION OF CHLOROXYLENES

[75] Inventors: Clifford Henry George Hands, deceased, late of Stourbridge, England; by Joan Hands, legal representative, Kinver, England; by Donald Watson, legal representative

[73] Assignee: Albright & Wilson Limited, Oldbury Warley, England

[22] Filed: Dec. 14, 1972

[21] Appl. No.: 314,943

[30] Foreign Application Priority Data
Dec. 14, 1971 United Kingdom............. 58023/71

[52] U.S. Cl. .................... 203/6; 203/59; 203/6; 203/7; 260/650 R; 260/651 R; 203/91
[51] Int. Cl.²............................................ B01D 1/00
[58] Field of Search ................. 260/650 R, 651 R; 203/6–9, 29, 33, 38, 36, 37, 57, 59, 60, 58

[56] References Cited

UNITED STATES PATENTS

| | | | |
|---|---|---|---|
| 2,442,230 | 5/1948 | Berg | 203/8 |
| 2,493,427 | 1/1950 | Thomas | 260/651 R |
| 2,653,904 | 9/1953 | Hanna et al. | 203/36 |
| 2,755,235 | 7/1956 | Governale | 203/6 |
| 2,817,632 | 12/1957 | Mayor | 260/651 R |
| 2,817,633 | 12/1957 | Mayor | 260/651 R |
| 2,844,635 | 7/1958 | Mayor | 260/651 R |
| 2,979,448 | 4/1961 | Miller | 260/651 R |
| 3,703,473 | 11/1972 | Lasco | 260/651 R |
| 3,715,283 | 2/1973 | Bockmann | 260/651 R |

FOREIGN PATENTS OR APPLICATIONS 826,291 12/1959 United Kingdom............. 203/6

OTHER PUBLICATIONS

The Merck Index, 7th Edit., 1960, N.J., p. 10.

*Primary Examiner*—Norman Yudkoff
*Assistant Examiner*—Frank Sever
*Attorney, Agent, or Firm*—Flynn & Frishauf

[57] ABSTRACT

Mono-chloroxylene is separated from the product of side chain chlorination of xylene by distillation under reduced pressure from that product to leave a still residue having an increased proportion of xylene dichloride. The distillation is carried out on a mixture of the chlorination product and an aliphatic amine which sequesters iron, preferably triethylamine.

11 Claims, No Drawings

DISTILLATION OF CHLOROXYLENES

The present invention relates to the distillation of chlorinated hydrocarbons. In particular it relates to the distillation of the chlorination products of xylene, for example, the products obtained by reaction of xylene with chlorine under the influence of ultra violet light. Unfortunately, the distillation of such chlorinated material tends to result in polymerization of the product causing gelling of the material in the still, and may result in a totally unsatisfactory product.

We have now found that we may carry out a successful distillation of the chlorination products of xylene if there is present in the still a small amount of a base and a compound capable of sequestering iron. It is of course possible, and indeed is normally desirable, that the same compound is employed for both of these roles. Without wishing to be bound by any particular theory, we believe that the presence of such compounds in the still tends to remove from the distillate two of the catalysts which tend to cause gelling namely hydrogen chloride gas and iron.

Suitable compounds for use such as stabilisers accomplishing both of the functions during the distillation include aliphatic amines such as triethylamine, methyl diethylamine, tri propylamines tributylamines aniline and mono and dialkyl anilines.

Normally the amount of stabilising compound employed will be present in a total amount of from 0.02 to 1%, often below 0.5% for example in the range 0.05 to 0.15% by weight based on the total weight of material present in the still.

The stabiliser may be employed in both batch and continuous distillations of the chlorination products of xylene. In the case of a batch distillation the stabiliser is placed in the still prior to commencing the distillation, in the case of a continuous distillation the stabiliser is mixed with the mixture of chloroxylenes prior to introduction to the still.

The material which is distilled is obtained by the chlorination of paraxylene, for example by chlorine gas under the influence of ultra violet light in the first case or in the dark in the latter case. Frequently a small quantity of phosphorus pentoxide is also present as a catalyst for chlorinations of xylene. Normally the xylene is dissolved in a solvent such as carbon tetrachloride. Typically after the chlorination of xylene the product contains, apart from the solvent, 4 – 6% molar unreacted paraxylene, 37 – 40% molar monochloroparaxylene, 7 – 9% molar$\alpha\alpha$-dichloroparaxylene, 37 – 40% $\alpha\alpha'$dichloroparaxylene and 6 – 8% molar$\alpha\alpha\alpha'$trichloroparaxylene. It is a mixture such as this, also containing some solvent which is introduced to the still.

Distillations according to the invention are conveniently carried out under reduced pressure, for example at around 20 mm of mercury. The mixture is refluxed in the still and if such a reduced pressure is employed the temperature at the top of the column will normally be in the range 90° to 100°C. Preferably the still employed for the reaction should be constructed of such materials as to reduce the possibility of iron being dissolved in the system. For example it may be glass lined and any fillings made of chemically inert nonporous material, for example glass Rasching rings.

The residue obtained after such a distillation is normally free from the solvent employed for the chlorination stage and of paraxylene, it also has a considerably reduced content of monochloroxylene. The paraxylene and monochloroxylene distilled off may be recycled for further chlorination. Typically the residue obtained has a molar % content of 6 – 10% monochloroxylene and 10–14% $\alpha\alpha$dichloroxylene, 66–70% $\alpha\alpha'$dichloroxylene and 10–14% $\alpha\alpha\alpha'$trichloroxylene.

Such a chlorination stage is employed in the production of p-xylene glycol dimethyl ether from xylene, the product of the chlorination subsequently being subjected to alkaline methoxylation. This product may be reacted with other aromatic compounds to produce a polymer.

Hitherto such polymers have been produced only from pure paraxylylene ether. This has required that a fractional crystallization step be carried out after the chlorination of xylene to give the desired product. This is as a result of the chlorination giving a mixture of products mainly $\alpha\alpha$dichloroxylene, $\alpha\alpha'$dichloroxylene, $\alpha\alpha\alpha'$trichloroxylene and monochloroxylene.

We have now found it possible to use a less pure form of paraxylylene dimethyl ether and that it is only essential to remove the monochloroxylene from the chlorinated product and methoxylation product of the other chloro derivatives may be tolerated. Thus it is no longer necessary to carry out a fractional crystallization step to separate the dichloroxylene from the other reactants, a simple distillation by the process of the present invention to remove the monochloroxylene will suffice.

Such a chlorinated product may be caused to react with an alcohol, such as methanol under alkaline conditions. For example, the mixture of chlorinated xylenes obtained from the still may be mixed with the desired alcohol and heated under reflux and an alcoholic solution of caustic soda then admixed with it. The product may then be refluxed for a further period of a few, typically about, 3 hours. The alcohol and water formed will then normally be distilled off. After cooling the reaction product may be washed with brine and then give an organic layer consisting essentially of the desired ethers. This may be separated from the brine and distilled for further purification. If such a distillation is employed it may be desirable to incorporate a reducing agent, such as a mixture of zinc and zinc oxide into the still to prevent the formation of peroxides.

The mixture of xylylene glycol ethers produced by the reaction may be reacted with an excess of a phenol in the presence of a Friedel Craft catalyst to produce Xylok resins for example as described in U.S. Pat. No. 3,576,788 which is incorporated herein by reference.

However, other uses may also be found both for the mixture of chlorinated xylenes obtained by the distillation according to the invention and for the mixture of glycol ethers obtained from them.

The process of the invention is illustrated by the following example in which all percentages are by weight. 205 parts of a mixture obtained by the chlorination of xylene under the influence of ultra violet light comprising:

| | |
|---|---|
| 3.5% | P xylene |
| 33.5% | 2 methyl benzyl chloride |
| 8.5% | $\alpha\alpha$ dichloro P xylene |
| 41.4% | $\alpha\alpha'$ dichloro P xylene |
| 9.2% | $\alpha\alpha\alpha''$ trichloro P xylene | was introduced together with 0.1% triethylamine in a 30 gallon glass lined still. The still was surmounted by a 15ft. long column packed with ⅝ inch borosilicate glass Rasching rings and a glass coil water-cooled total condenser. The still was heated by circulating Dowtherm A at a temperature in the range of 175°C to 180°C in its jacket. The temperature at the top of the column was 90°–100°C at a pressure of 20 mm Hg. No decomposition of the product occurred and the recovery of the distillate (75 parts of mainly p methyl benzyl chloride) and the residue (130 parts of di or trichlorinated p xylenes) indicated that none of the material had been lost.

Comparative Experiment

A similar distillation was carried out in the same apparatus without the addition of triethylamine. A large amount of solid was deposited in the column indicating that a substantial proportion of the material had been lost.

We claim:

1. A method of removing mono-chloroxylene from a mixture of α,α'-dichloroxylene and mono-chloroxylene comprising admixing an aliphatic amine which sequesters iron with said mixture, and heating, and distilling under reduced pressure from said mixture α-mono-chloroxylene to leave an undistilled residue, and recovering said residue having an increased content of α-α'-dichloroxylene and a reduced content of mono-chloroxylene.

2. A process as claimed in claim 1 wherein said aliphatic amine is triethylamine.

3. A process as claimed in claim 1 wherein the temperature of mono-chloroxylene being collected from the distillation is in the range 90° to 100°C.

4. A process as claimed in claim 3 wherein said aliphatic amine is present in an amount of from 0.05 to 0.15% of weight based on the weight of material being distilled and wherein said distillation is carried out at a pressure of about 20 mm of mercury.

5. A process as claimed in claim 4 wherein said aliphatic amine is triethylamine.

6. A process as claimed in claim 1 wherein said aliphatic amine is present in an amount of from 0.05 to 0.15% by weight based on the weight of material being distilled.

7. A process as claimed in claim 6 wherein said aliphatic amine is triethylamine.

8. A process as claimed in claim 7 wherein the distillation is carried out at a pressure of about 20mm. of mercury.

9. A process as claimed in claim 1 wherein said aliphatic amine is present in an amount of from 0.02 to 1% by weight of the material being distilled.

10. A process as claimed in claim 9 wherein said aliphatic amine is triethylamine.

11. A process as claimed in claim 9 wherein the temperature of mono-chloroxylene being collected from the distillation is in the range 90° to 100°C.

* * * * *

UNITED STATES PATENT OFFICE
CERTIFICATE OF CORRECTION

Patent No. 3,919,054   Dated November 11, 1975

Inventor(s) CLIFFORD HENRY GEORGE HANDS

It is certified that error appears in the above-identified patent and that said Letters Patent are hereby corrected as shown below:

Column 1, line 44, delete "or in the dark in the latter case".

Column 2, line 15, before "ether" insert --glycol--.

Column 2, line 50, delete "Xylok".

Column 2, line 62, replace "2 methyl benzyl chloride" with --p-methyl benzyl chloride--.

Signed and Sealed this twenty-third Day of March 1976

[SEAL]

Attest:

RUTH C. MASON
Attesting Officer

C. MARSHALL DANN
Commissioner of Patents and Trademarks